*US008963351B2*

US008963351B2

(12) United States Patent
Kaita et al.

(10) Patent No.: US 8,963,351 B2
(45) Date of Patent: Feb. 24, 2015

(54) HYBRID VEHICLE AND OUTPUT CONTROL METHOD OF VEHICLE-MOUNTED POWER STORAGE DEVICE

(75) Inventors: Keiji Kaita, Miyoshi (JP); Yoshiaki Kikuchi, Toyota (JP); Yoshihiko Hiroe, Toyota (JP); Motoyoshi Okumura, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/111,080

(22) PCT Filed: Apr. 14, 2011

(86) PCT No.: PCT/JP2011/059250
§ 371 (c)(1),
(2), (4) Date: Oct. 10, 2013

(87) PCT Pub. No.: WO2012/140762
PCT Pub. Date: Oct. 18, 2012

(65) Prior Publication Data
US 2014/0028032 A1    Jan. 30, 2014

(51) Int. Cl.
*F02N 11/06*    (2006.01)
*F02N 11/08*    (2006.01)
*B60K 6/445*    (2007.10)
*B60W 10/06*    (2006.01)
*B60W 10/08*    (2006.01)
*B60W 20/00*    (2006.01)
*B60W 50/00*    (2006.01)

(52) U.S. Cl.
CPC ............ *F02N 11/0862* (2013.01); *B60K 6/445* (2013.01); *B60W 10/06* (2013.01); *B60W 10/08* (2013.01); *B60W 20/40* (2013.01); *B60W 50/0098* (2013.01); *B60W 2510/085* (2013.01); *B60W 2710/086* (2013.01); *B60W 2050/0089* (2013.01); *Y02T 10/6286* (2013.01); *Y02T 10/6239* (2013.01)
USPC ....................................................... 290/40 R

(58) Field of Classification Search
USPC ....... 290/40 B, 40 C, 40 R; 180/65.26, 65.31, 180/65.1, 65.285, 65.29
See application file for complete search history.

(56) References Cited

U.S. PATENT DOCUMENTS

| 6,879,888 | B2 * | 4/2005 | Ochiai et al. ..................... 701/22 |
| 6,923,279 | B2 * | 8/2005 | Shimane et al. ............. 180/65.1 |
| 7,148,653 | B2 * | 12/2006 | Mauro et al. .................. 320/104 |
| 7,215,034 | B2 * | 5/2007 | Hino et al. ................... 290/40 C |
| 7,342,382 | B1 * | 3/2008 | Blackburn et al. .............. 322/16 |
| 8,039,976 | B2 * | 10/2011 | Sato et al. ................... 290/40 C |
| 8,212,532 | B2 * | 7/2012 | Kumar .......................... 320/155 |

(Continued)

FOREIGN PATENT DOCUMENTS

JP    A-2005-039989    2/2005

*Primary Examiner* — Julio Gonzalez
*Assistant Examiner* — Viet Nguyen
(74) *Attorney, Agent, or Firm* — Oliff PLC

(57) ABSTRACT

When electric power exceeding output allowable power at an engine startup time is output from a power storage device, deviated from a predetermined period of time during which the output allowable power of the power storage device is switched, an ECU suppresses increase of the output allowable power for the next startup time of the engine. Specifically, the ECU modifies the output allowable power for the next startup time of the engine from a first value to a second value lower than the first value, based on a period of time before deviation is eliminated.

14 Claims, 17 Drawing Sheets

(56) References Cited

U.S. PATENT DOCUMENTS

| | | | |
|---|---|---|---|
| 8,380,452 B2 * | 2/2013 | Maegawa et al. | 702/63 |
| 8,466,708 B2 * | 6/2013 | Kawahara et al. | 324/764.01 |
| 8,473,136 B2 * | 6/2013 | Kato et al. | 701/22 |
| 2004/0145186 A1 * | 7/2004 | Inokuchi et al. | 290/40 C |

* cited by examiner

HYBRID VEHICLE AND OUTPUT CONTROL METHOD OF VEHICLE-MOUNTED POWER STORAGE DEVICE

TECHNICAL FIELD

The present invention relates to a hybrid vehicle, and an output control method of a power storage device mounted on the hybrid vehicle. Particularly, the present invention relates to output control of a power storage device in a hybrid vehicle incorporating an internal combustion engine.

BACKGROUND ART

Hybrid vehicles are attracting attention as environment-friendly vehicles. A hybrid vehicle incorporates a power storage device, an inverter, and an electric motor driven by the inverter, in addition to a conventional internal combustion engine, as the power source for traction.

Japanese Patent Laying-Open No. 2005-39989 (PTD 1) discloses an output control device for controlling the battery output in a hybrid car such as the aforementioned type. A hybrid car includes an engine, and starting means that can start the engine in association with charging/discharging of the traction battery. The output control device allows output from a battery until a predetermined excessive output that exceeds the rated output is achieved when the required output from the battery based on the driver's request exceeds the rated output or at the time of starting the engine.

According to this output control device, the performance of the automobile can be improved by exhibiting further the battery performance (refer to PTD 1).

CITATION LIST

Patent Document

PTD 1: Japanese Patent Laying-Open No. 2005-39989

SUMMARY OF INVENTION

Technical Problem

At the output control device disclosed in the aforementioned publication, the output allowable power (Wout) indicating the value of the allowed output power of the battery is temporarily increased at the engine starting time. However, in the case where the engine friction is increased due to the boosted engine oil viscosity when the temperature of the engine is low, or in the case where the fuel volatilization is suppressed due to the combustion chamber and/or intake port being cooled, or in the case where the engine compression or the performance of the fuel system, ignition system, and lubrication system is degraded due to usage over time, the engine startup performance may be so degraded such that the engine cannot attain complete combustion during the period of time where the battery output allowable power is increased. Accordingly, excessive electric power may be output from the battery by deviation of the output allowable power at the engine startup time.

In this context, a possible approach is to restrict the output allowable power setting in advance in view of the aforementioned change in the state of engine. However, this will restrict the battery output without any exception, leading to degradation in the vehicle performance. Although protection control to prevent the battery voltage from becoming lower than a predetermined threshold value in the event of the battery output power exceeding the output allowable power will eventually work such that battery overdischarging is avoided, degradation in driveability caused by operation of such protection control will become an issue of concern. The aforementioned publication is silent about such an issue.

In view of the foregoing, an object of the present invention is to provide a hybrid vehicle that can suppress excessive output from a power storage device at the startup time of the internal combustion engine while allowing sufficient exhibition of the power storage device capability.

Another object of the present invention is to provide an output control method of a power storage device in a hybrid vehicle that can suppress excessive output from a power storage device at the startup time of the internal combustion engine while allowing sufficient exhibition of the power storage device capability.

Solution to Problem

A hybrid vehicle according to the present invention includes a power storage device storing electric power for traction, an internal combustion engine, a rotating electric machine, and a control device. The rotating electric machine receives supply of electric power from the power storage device and generates torque required to start the internal combustion engine. When the electric power required for the power storage device at a startup time of the internal combustion engine exceeds output allowable power (Wout) indicating a value of output power allowed from the power storage device at a startup requested time of the internal combustion engine, the control device temporarily switches the output allowable power from first allowable power (WoutN) for the startup requested time to second allowable power (WoutE) greater than the first allowable power. When electric power exceeding the output allowable power is output from the power storage device at the startup time of the internal combustion engine, deviated from the period of time during which the output allowable power is switched to the second allowable power, the control device suppresses increase of the output allowable power for the next startup time of the internal combustion engine.

Preferably, the control device modifies the second allowable power for the next startup time of the internal combustion engine from a first value (WoutE (1)) to a second value (WoutE (2)) lower than the first value based on the time deviated from the period of time during which the output allowable power is switched to the second allowable power.

Further preferably, the second value is determined based on the aforementioned deviated time using data prepared in advance, indicating the relationship between the output power from the power storage device and the allowable time during which output can be provided continuously from the power storage device.

Also preferably, the control device shortens the period of time during which the output allowable power is switched to the second allowable power for next startup time of the internal combustion engine based on the time deviated from the period of time during which the output allowable power is switched to the second allowable power.

Further preferably, the control device shortens the period of time during which the output allowable power is switched to the second allowable power as the deviated time becomes longer.

Preferably, the control device corrects the second allowable power based on the temperature of the internal combustion engine.

Further preferably, the control device corrects the second allowable power to become smaller as the temperature of the internal combustion engine becomes lower.

Also preferably, the control device corrects the second allowable power based on the temperature of the rotating electric machine.

Further preferably, the control device corrects the second allowable power to become smaller as the temperature of the rotating electric machine becomes higher.

An output control method of a power storage device according to the present invention is a method directed to a power storage device mounted on a hybrid vehicle. The hybrid vehicle includes a power storage device storing electric power for traction, an internal combustion engine, and a rotating electric machine. The rotating electric machine receives supply of electric power from the power storage device to generate torque required to start the internal combustion engine. The output control method includes the steps of: when the electric power required for the power storage device at a startup time of the internal combustion engine exceeds output allowable power (Wout) indicating a value of output power allowed from the power storage device for a startup requested time of the internal combustion engine, temporarily switching the output allowable power from first allowable power (WoutN) at the startup requested time to second allowable power (WoutE) greater than the first allowable power; and when electric power exceeding the output allowable power is output from the power storage device at the startup time of the internal combustion engine, deviated from the period of time during which the output allowable power is switched to the second allowable power, suppressing increase of the output allowable power for the next startup time of the internal combustion engine.

Preferably, the step of suppressing increase of the output allowable power includes the step of modifying the second allowable power for the next startup time of the internal combustion engine from a first value (WoutE (1)) to a second value (WoutE (2)) lower than the first value based on a time deviated from the period of time during which the output allowable power is switched to the second allowable power.

Also preferably, the step of suppressing increase of the output allowable power includes the step of shortening the period of time during which the output allowable power is switched to the second allowable power for the next startup time of the internal combustion engine based on the time deviated from the period of time during which the output allowable power is switched to the second allowable power.

Preferably, the output control method of a power storage device further includes the step of correcting the second allowable power based on the temperature of the internal combustion engine.

Also preferably, the output control method of a power storage device further includes the step of correcting the second allowable power based on the temperature of the rotating electric machine.

Advantageous Effect of Invention

In the case where electric power exceeding the output allowable power is output from the power storage device at the startup time of the internal combustion engine, deviated from the period of time during which the output allowable power is switched to the second allowable power (WoutE) in the present invention, increase of the output allowable power for the next startup time of the internal combustion engine is suppressed. Therefore, the present invention allows the capability of the power storage device to be exhibited sufficiently while suppressing excessive output from the power storage device at a startup time of the internal combustion engine. As a result, the design margin of the power storage device can be determined adequately, contributing to reducing the weight, size, cost and the like of the vehicle.

DESCRIPTION OF EMBODIMENTS

Figure 1:
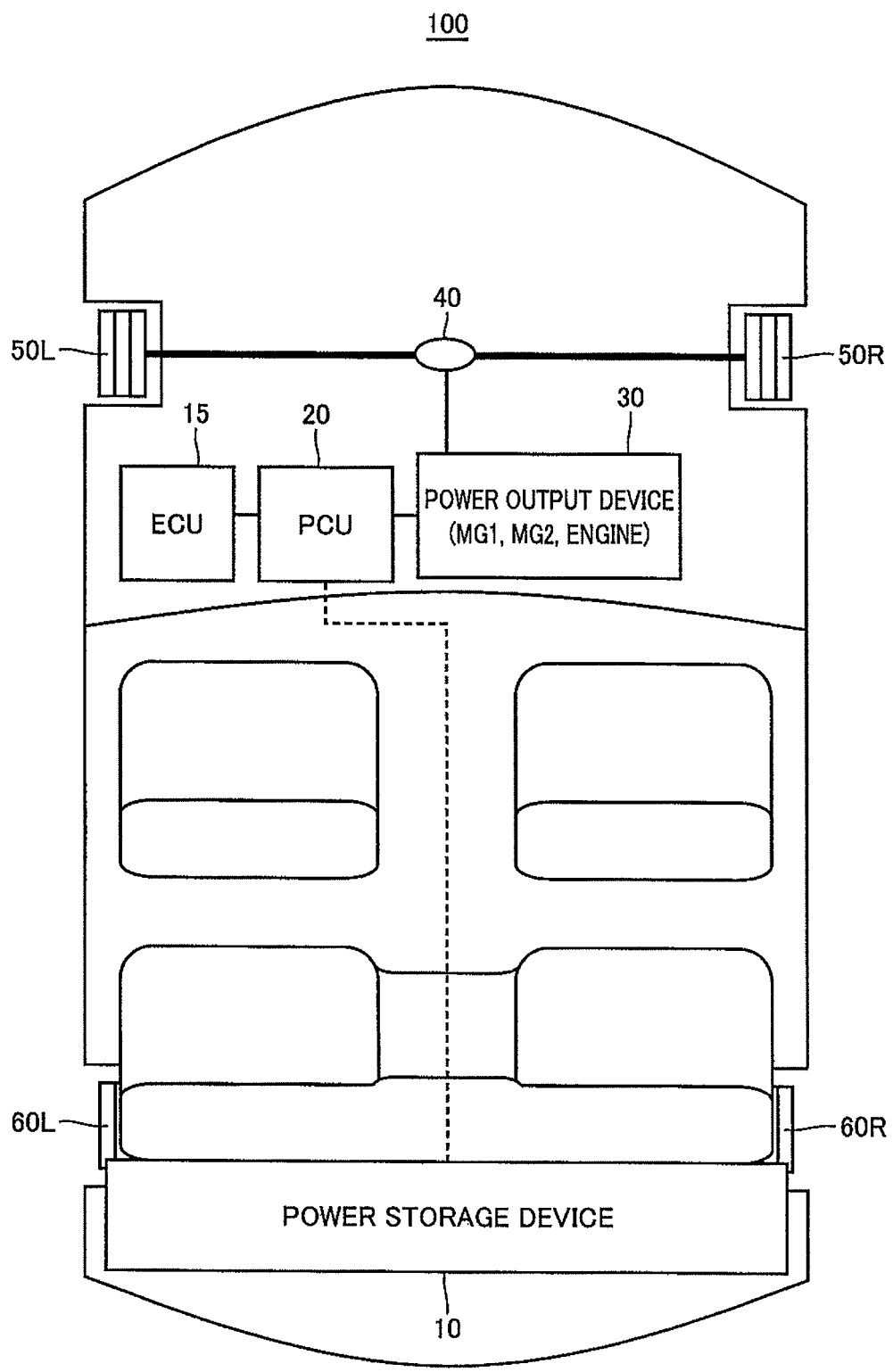
FIG. 1 is a block diagram representing an entire configuration of a hybrid vehicle according to a first embodiment of the present invention.

Embodiments of the present invention will be described in detail with reference to the drawings. In the drawings, the same or corresponding elements have the same reference characters allotted, and description thereof will not be repeated.

First Embodiment

FIG. 1 is a block diagram representing an entire configuration of a hybrid vehicle according to a first embodiment of the present invention. Referring to FIG. 1, a hybrid vehicle 100 includes a power storage device 10, an electronic control unit (hereinafter, referred to as ECU) 15, a power control unit ((hereinafter, referred to as PCU) 20, a power output device 30, a transmission gear 40, front wheels 50L and 50R, and rear wheels 60L and 60R.

Power storage device 10 is a rechargeable DC power source, formed of a secondary battery such as nickel-metal hydride or lithium ion, for example. Power storage device 10 is disposed at a rear side region of the rear seat for example, and electrically connected with PCU 20 to supply DC voltage thereto. Power storage device 10 receives electric power generated by power output device 30 from PCU 20 to be charged.

PCU 20 generically shows a power converter required in hybrid vehicle 100. PCU 20 includes a converter boosting the voltage supplied from power storage device 10, an inverter driving a motor generator included in power output device 30, and the like.

Power output device 30 is provided as the driving source of the wheels, and includes motor generators MG1 and MG2 and an engine. These components are mechanically coupled via a power split device (not shown). In accordance with the running state of hybrid vehicle 100, distribution of the driving force and coupling are implemented among the aforementioned three components via the power split device. As a result, front wheels 50L and 50R are driven. Transmission gear 40 transmits the motive power output from power output device 30 to front wheels 50L and 50R, and transmits the rotational force from front wheels 50L and 50R to power output device 30. Accordingly, power output device 30 transmits the motive power from the engine and motor generator to front wheels 50L and 50R via transmission gear 40 to drive front wheels 50L and 50R. Power output device 30 receives the rotational force from front wheels 50L and 50R to generate power and provide the generated power to PCU 20.

ECU 15 receives signals from various types of sensors (not shown) indicating the driving state and vehicle state. The signal from various sensors include an accelerator pedal position signal corresponding to the stepping amount on an accelerator pedal, a vehicle speed signal indicating the speed of the vehicle, detection signals of the voltage and current of power storage device 10, and the like. ECU 15 executes various control related to hybrid vehicle 100 based on the signals from various sensors.

PCU 20 responds to a control instruction from ECU 15 to convert the electric power from power storage device 10 into alternating current to drive motor generators MG1 and MG2 in power output device 30. In a regenerative operation mode of motor generators MG1 and MG2, PCU 20 responds to a control instruction from ECU 15 to convert the electric power generated by motor generators MG1 and MG2 into the voltage for charging power storage device 10.

Figure 2:
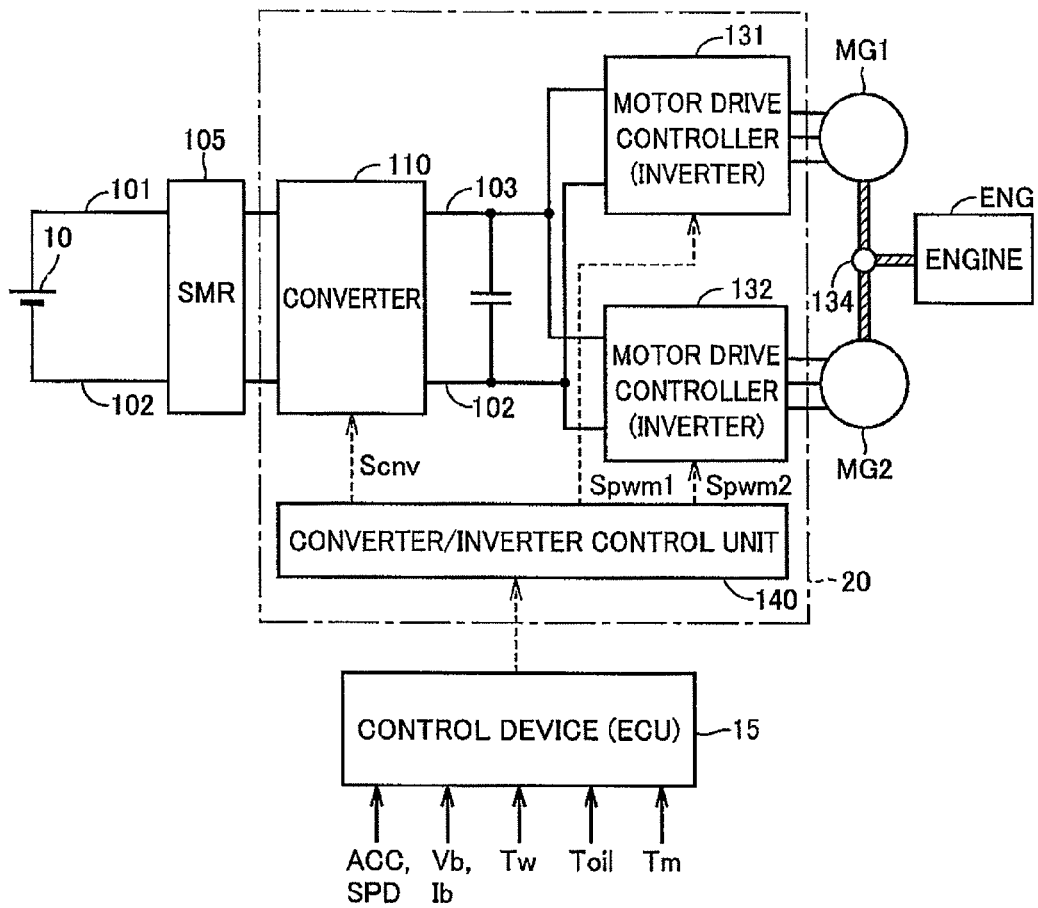
FIG. 2 is a block diagram of a configuration of a powertrain of the hybrid vehicle.

FIG. 2 is a block diagram representing a configuration of a powertrain of hybrid vehicle 100. Referring to FIG. 2, hybrid vehicle 100 includes a power storage device 10, a system main relay (SMR) 105, PCU 20, motor generators MG1, MG2, engine ENG, power split device 134, and ECU 15.

Power split device 134 is coupled to engine ENG and motor generators MG1, MG2 to distribute the power therebetween. For example, a planetary gear having the three rotational shafts of a sun gear, a planetary carrier, and a ring gear can be employed as power split device 134. These three rotational shafts are connected to the rotational shafts of motor generator MG1, engine ENG, and motor generator MG2, respectively. The rotational shaft of transmission gear 40 (FIG. 1) is linked to the rotational shaft of motor generator MG2.

The kinetic energy generated by engine ENG is split between motor generator MG1 and transmission gear 40 by power split device 134. Engine ENG operates as a power source for driving the vehicle forward and driving motor generator MG1.

Motor generator MG1 receives power supply from power storage device 10 to operate as a motor, and generates torque for startup of engine ENG. When engine ENG is started, motor generator MG1 operates as a power generator, and receives the output from engine ENG distributed by power split device 134 to generate power.

Motor generator MG2 is driven by at least one of the electric power stored in power storage device 10 and the electric power generated by motor generator MG1. The driving force of motor generator MG2 is transmitted to the drive shaft of front wheels 50L, 50R (FIG. 1) via transmission gear 40. In a vehicle braking mode, motor generator MG2 is driven by front wheels 50L, 50R to operate as a power generator. At this stage, the electric power generated by motor generator MG2 is charged to power storage device 10 via PCU 20.

SMR 105 is provided between power storage device 10 and PCU 20, and is set on in response to a command from ECU 15 when the vehicle system is activated.

PCU 20 includes a converter 110, motor drive controllers 131 and 132, and a converter/inverter control unit 140. In the first embodiment, motor generators MG1 and MG2 are AC motors, whereas motor drive controllers 131 and 132 are constituted of inverters. Motor drive controller 131(132) is also referred to as "inverter 131 (132)", hereinafter.

Converter 110 boosts the voltage between a positive line 103 and a negative line 102 (system voltage) to a level greater than or equal to the voltage of power storage device 10 based on a control signal Scnv from converter/inverter control unit 140. Converter 110 is constituted of a current invertible type boost chopper circuit, for example.

Inverters 131 and 132 are provided corresponding to motor generators MG1 and MG2, respectively. Inverters 131 and 132 are connected to converter 110 parallel to each other for driving motor generators MG1 and MG2 based on control signals Spwm1 and Spwm2, respectively, from converter/inverter control unit 140.

Converter/inverter control unit 140 generates control signals Scnv, Spwm1 and Spwm2 for driving converter 110, motor generator MG1 and motor generator MG2, respectively, based on a control command received from ECU 15 (the set system voltage, the torque target value of motor generators MG1, MG2, and the like). Converter/inverter control unit 140 outputs the generated control signals Scnv, Spwm1 and Spwm2 to converter 110, inverter 131, and inverter 132, respectively.

ECU 15 carries out various control such as controlling the charging/discharging of power storage device 10, the running of the vehicle, and the like through software processing by executing a prestored program at the CPU (Central Processing Unit), and/or through hardware processing by a dedicated electronic circuit. ECU 15 generates a control command to drive PCU 20, and provides the generated control command to converter/inverter control unit 140 of PCU 20.

Figure 3:
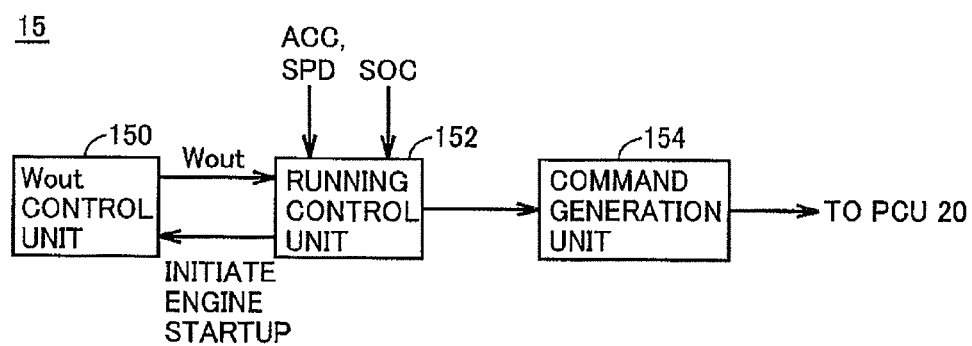
FIG. 3 is a functional block diagram of the ECU shown in FIG. 2.

FIG. 3 is a functional block diagram of ECU 15 shown in FIG. 2. Referring to FIG. 3, ECU 15 includes a Wout control unit 150, a running control unit 152, and a command generation unit 154.

Wout control unit 150 calculates output allowable power Wout indicating a value of output power allowed from power storage device 10. Specifically Wout control unit 150 uses a map, a relational expression, or the like prepared in advance to calculate output allowable power Wout based on the SOC of power storage device 10, the temperature, and the like.

Upon receiving a signal indicating startup of engine ENG from running control unit 152, Wout control unit 150 determines whether the required power for power storage device 10 exceeds output allowable power Wout or not. The required electric power for power storage device 10 is the running power by motor generator MG2 (proportional to the required driving force calculated from the accelerator pedal position and the like) plus the engine startup power (proportional to the vehicle speed and the like) to drive motor generator MG1 in a power running mode to start engine ENG. When the required electric power for power storage device 10 exceeds output allowable power Wout, Wout control unit 150 switches output allowable power Wout to the power directed to the engine startup time until engine ENG attains full combustion.

Wout control unit 150 includes, as output allowable power Wout, output allowable power WoutN indicating the output allowable power Wout in a normal mode (non-startup time of engine), and output allowable power WoutE indicating the output allowable power Wout at a startup time of the engine. Output allowable power WoutN in a normal mode is calculated based on the SOC of power storage device 10, the temperature, and the like, as mentioned above. Output allowable power WoutE in an engine startup time is set at a value greater than output allowable power WoutN to allow starting of engine ENG. For example, output allowable power WoutE corresponds to output allowable power WoutN plus the engine startup power.

In the case where the required electric power for power storage device 10 exceeds output allowable power Wout (output allowable power WoutN) at a startup requested time of engine ENG, output allowable power Wout is switched from output allowable power WoutN to output allowable power WoutE until engine ENG attains complete combustion. Whether engine ENG has attained complete combustion or not is determined from the rotating speed of engine ENG or the torque of motor generator MG1, or the like. The profile of output allowable power Wout at an engine startup time (output allowable power WoutE and the period of time switched to output allowable power WoutE) is determined using data prepared in advance, indicating the relationship between the output power of power storage device 10 and the allowable time during which output can be provided continuously from power storage device 10.

In the case where the engine friction is increased due to the boosted engine oil viscosity when the temperature of the engine is low, or in the case where the fuel volatilization is suppressed due to the combustion chamber and/or intake port being cooled, or in the case where the engine compression or the performance of the fuel system, ignition system, and lubrication system is degraded due to usage over time, the engine may not attain complete combustion during the period of time where output allowable power Wout at an engine startup time is switched to output allowable power WoutE. Accordingly, excessive electric power may be output from power storage device 10 with deviation from output allowable power Wout. Thus, when electric power is output from the battery deviating from the profile of output allowable power Wout that is temporarily increased at the engine startup time, Wout control unit 150 modifies the profile of output allowable power Wout for the next startup time of engine ENG based on the deviated time. This will be described in detail hereinafter.

Figure 4:
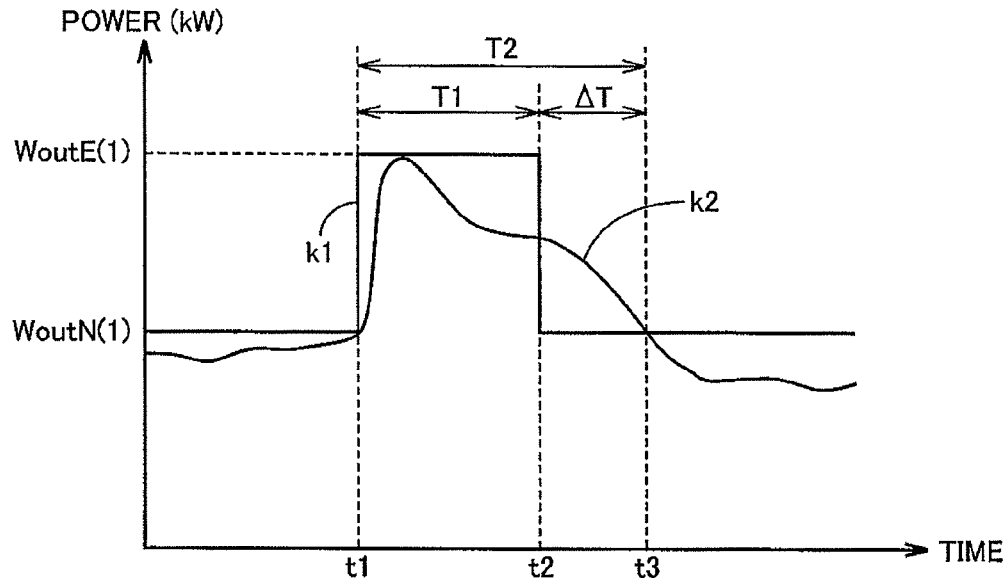
FIG. 4 represents output allowable power and output power from the power storage device at an engine startup time.

FIG. 4 represents output allowable power Wout and the output power from power storage device 10 for the startup time of engine ENG. Referring to FIG. 4, the electric power is plotted along the vertical axis, whereas time is plotted along the horizontal axis. Line k1 represents output allowable power Wout. Line k2 indicates the output power from power storage device 10. Values WoutN (1) and WoutE (1) represent the values of output allowable power WoutN and WoutE, respectively.

When startup of engine ENG is requested at time t1, a determination is made as to whether the required electric power for power storage device 10 corresponding to the running power plus the engine startup power exceeds output allowable power Wout (value WoutN (1)) at this timing. Here, it is assumed that the required power for power storage device 10 exceeds output allowable power Wout, so that output allowable power Wout is switched from output allowable power WoutN to output allowable power WoutE. Specifically, the value of output allowable power Wout is switched from value WoutN (1) to value WoutE (1). The period of time T1 during which output allowable power Wout is switched to output allowable power WoutE is predetermined using data prepared in advance, indicating the relationship between the output power of power storage device 10 and the allowable time during which output can be provided continuously from power storage device 10.

In the case where increase in engine friction caused by low temperature, suppression of fuel volatization, performance degradation of the fuel system, ignition system, lubrication system due to usage over time, or the like has not occurred, engine ENG attains complete combustion within the predesigned period of time T1, and after output allowable power Wout is switched back again to output allowable power WoutN at an elapse of time T1, the output power of power storage device 10 will not deviate from output allowable power Wout.

If the aforementioned state change occurs such as increase in the engine friction, engine ENG will not attain complete combustion within period of time T1. The output power of power storage device 10 will be deviated from output allowable power Wout (time t2-t3), after output allowable power Wout is switched back again to output allowable power WoutN at the elapse of period of time T1, as shown in FIG. 4.

In the first embodiment, the profile of output allowable power Wout for the next startup time of engine ENG is determined based on the deviated time $\Delta T(T2-T1)$. In other words, the value of output allowable power WoutE and the switched time to output allowable power WoutE for the next startup time of engine ENG are determined based on the aforementioned deviated time $\Delta T$ (or period of time T2 before deviation is eliminated after output allowable power Wout is switched to output allowable power WoutE).

Figure 5:
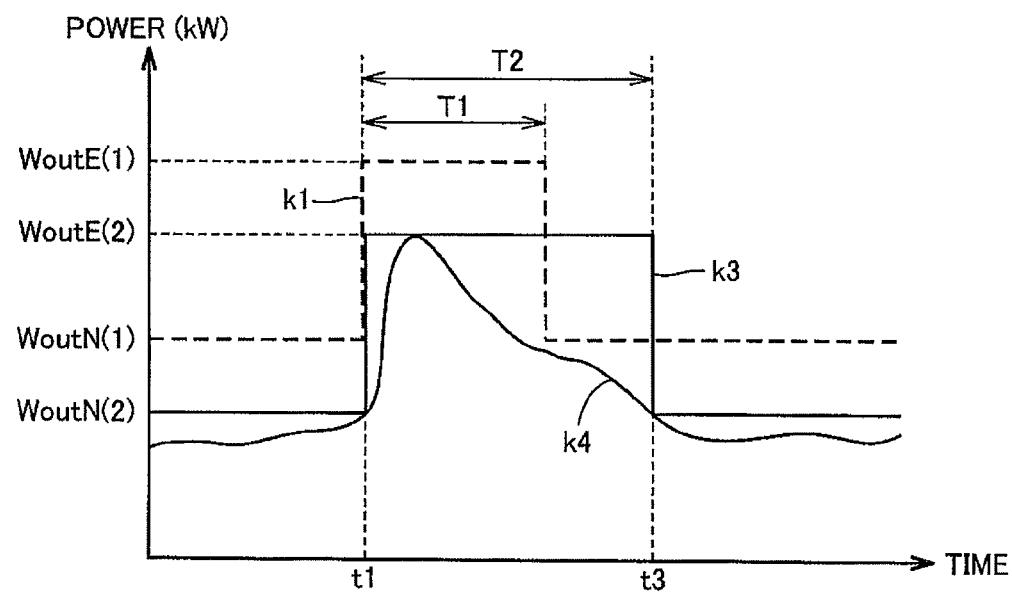
FIG. 5 represents the output allowable power and output power from the power storage device for the next startup time of the engine.

FIG. 5 represents output allowable power Wout and the output power of power storage device 10 for the next startup time of engine ENG. Referring to FIG. 5, electric power is plotted along the vertical axis whereas time is plotted along the horizontal axis. Line k3 represents output allowable power Wout. Line k4 represents the output power of power storage device 10. Line k1, value WoutE (1), WoutN (1) and period of time T1, T2 are as shown in FIG. 4.

Value WoutE (2) is a value of output allowable power WoutE. This value WoutE (2) is lower than value WoutE (1), and is determined based on period of time T2 using data prepared in advance, indicating the relationship between the output power of power storage device 10 and the allowable time during which output can be provided continuously from power storage device 10. In association with the modification of output allowable power WoutE from value WoutE (1) to value WoutE (2), output allowable power WoutN is also lowered from value WoutN (1) to value WoutN (2).

Thus, the profile of output allowable power Wout for the next startup time of engine ENG is modified based on deviated time $\Delta T$ (or period of time T2).

Figure 6:
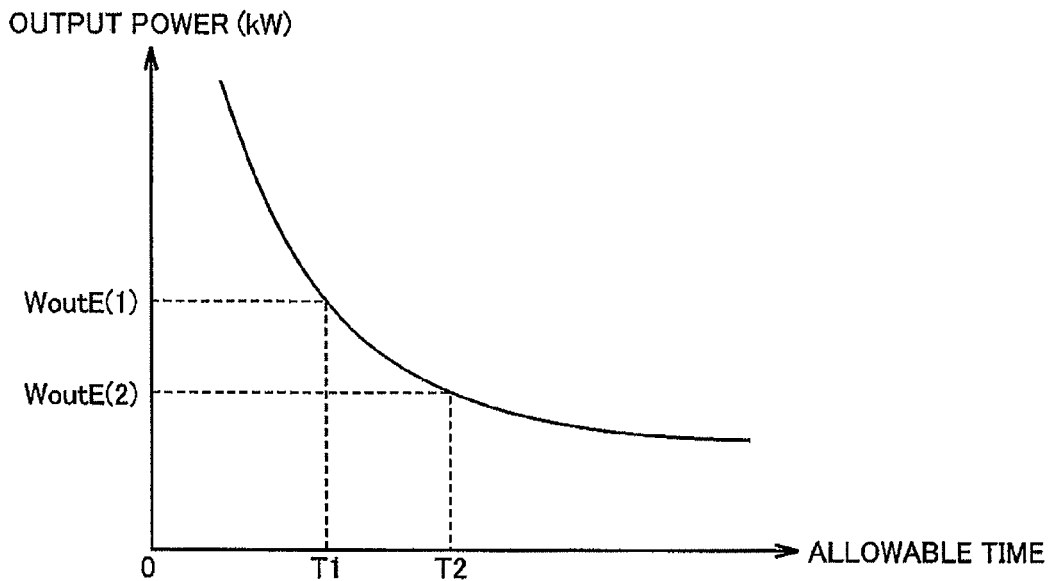
FIG. 6 represents the relationship between the output power of the level where reliability of the power storage device is ensured and the allowable time during which output can be provided continuously from the power storage device.

FIG. 6 represents the relationship between the output power where reliability of power storage device 10 is ensured and the allowable time during which output can be provided continuously from power storage device 10. Referring to FIG. 6, the output power of power storage device 10 is plotted along the vertical axis whereas the output allowable time from power storage device 10 is plotted along the horizontal axis. When the output power of power storage device 10 is WoutE (1), the reliability of power storage device 10 is ensured until time T1. When the output power of power storage device 10 is WoutE (2) (<WoutE (1)), the reliability of power storage device 10 is ensured until time T2 (>T1). The relationship shown in FIG. 6 is prepared in advance by gathering data during the design stage, fabrication stage, experiment stage, and the like.

In the first embodiment, the profile of output allowable power Wout for the next startup time of engine ENG (value WoutE (2) and time T2) is determined based on the aforementioned deviated time $\Delta T$ (time T2) using the graph (map or relational expression) shown in FIG. 5. Thus, deviation of the output power of power storage device 10 from the profile of output allowable power Wout set can be suppressed.

Referring to FIG. 3 again, running control unit 152 receives signals such as an accelerator pedal position signal ACC that varies: according to the stepped amount on the accelerator pedal, a vehicle speed signal SPD that varies according to the vehicle speed, the SOC (State of Charge) indicating the remaining amount in power storage device 10, and the like. The accelerator pedal position and vehicle speed are detected by a sensor (not shown). The SOC is calculated according to a well-known method based on the voltage and current of power storage device 10. Running control unit 152 receives output allowable power Wout from Wout control unit 150.

Running control unit 152 uses these values to execute running control such as generating the torque target value of motor generators MG1, MG2, the starting control of engine ENG, and the like. Specifically, running control unit 152 calculates the vehicle running required torque based on accelerator pedal position signal ACC and vehicle speed signal SPD, and provides the calculated value to command generation unit 154 as the torque target value of motor generator MG2.

Running control unit 152 calculates the vehicle running required power based on the calculated value of the running required torque. Further, running control unit 152 determines whether engine ENG is to be started or not based on the vehicle running required power and SOC of power storage device 10. When a determination is made that engine ENG is to be started, the torque target value of motor generator MG1 directed to starting engine ENG is calculated and output to command generation unit 154, and a signal indicating startup of engine ENG is output to Wout control unit 150.

Moreover, running control unit 152 calculates the power required to start engine ENG based on the aforementioned torque target value of motor generator MG1, and executes running control such that the total power obtained by adding the calculated engine startup power to the vehicle running required power does not exceed output allowable power Wout.

As to the startup timing of engine ENG, running control unit 152 determines, according to the vehicle speed, the timing to start engine ENG when engine ENG is stopped and running is performed by motor generator MG2 alone (hereinafter, also referred to as "EV running").

Figure 7:
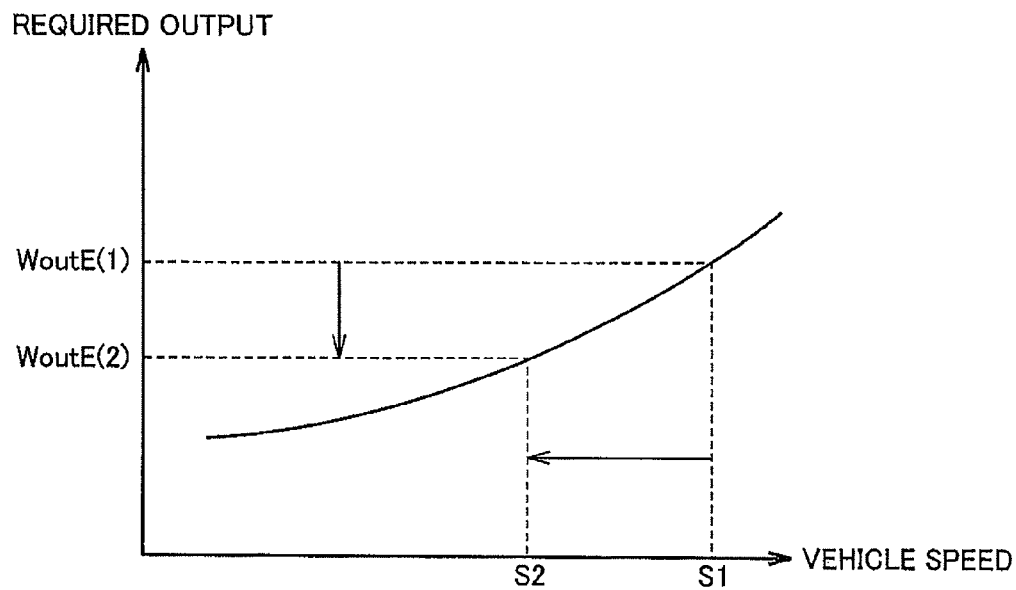
FIG. 7 represents the relationship between the vehicle speed and the required power for the power storage device in EV running.

FIG. 7 represents the relationship between the vehicle speed and the required power for power storage device 10 in an EV running mode. Referring to FIG. 7, the vehicle speed is plotted along the horizontal axis whereas the required power for power storage device 10 is plotted along the vertical axis. When power exceeding the corresponding required power at a certain vehicle speed is requested, running control unit 152 start engine ENG. Since the required power for power storage device 10 is smaller as the vehicle speed is lower, and the running power is increased as the vehicle speed becomes higher, the required power for power storage device 10 will become greater.

The power required for startup of engine ENG by motor generator MG1 (engine startup power) is included in the required power for power storage device 10. The engine startup power varies depending upon the vehicle speed. For example, the engine startup power is proportional to the vehicle speed.

Since the output of power storage device 10 should be controlled to avoid exceeding output allowable power Wout, running control unit 152 causes startup of engine ENG when the required power for power storage device 10 exceeds output allowable power Wout. Therefore, when output allowable power WoutE is reduced from value WoutE (1) to value WoutE (2), the vehicle speed at which engine ENG is started is lowered from S1 to S2. In other words, when output allowable power WoutE is lowered from value WoutE (1) to value WoutE (2) by Wout control unit 150 (FIG. 3), the startup timing of engine ENG is shifted to the lower speed side. As a result, the output power of power storage device 10 at the engine startup time will be suppressed.

Referring to FIG. 3 again, command generation unit 154 generates the torque command value and rotational speed command value for inverters 131 and 132 of PCU 20 based on the control command from running control unit 152. Further, command generation unit 154 generates the output voltage command value of converter 110. Then, command generation unit 154 outputs the generated command value to converter/inverter control unit 140 of PCU 20.

Figure 8:
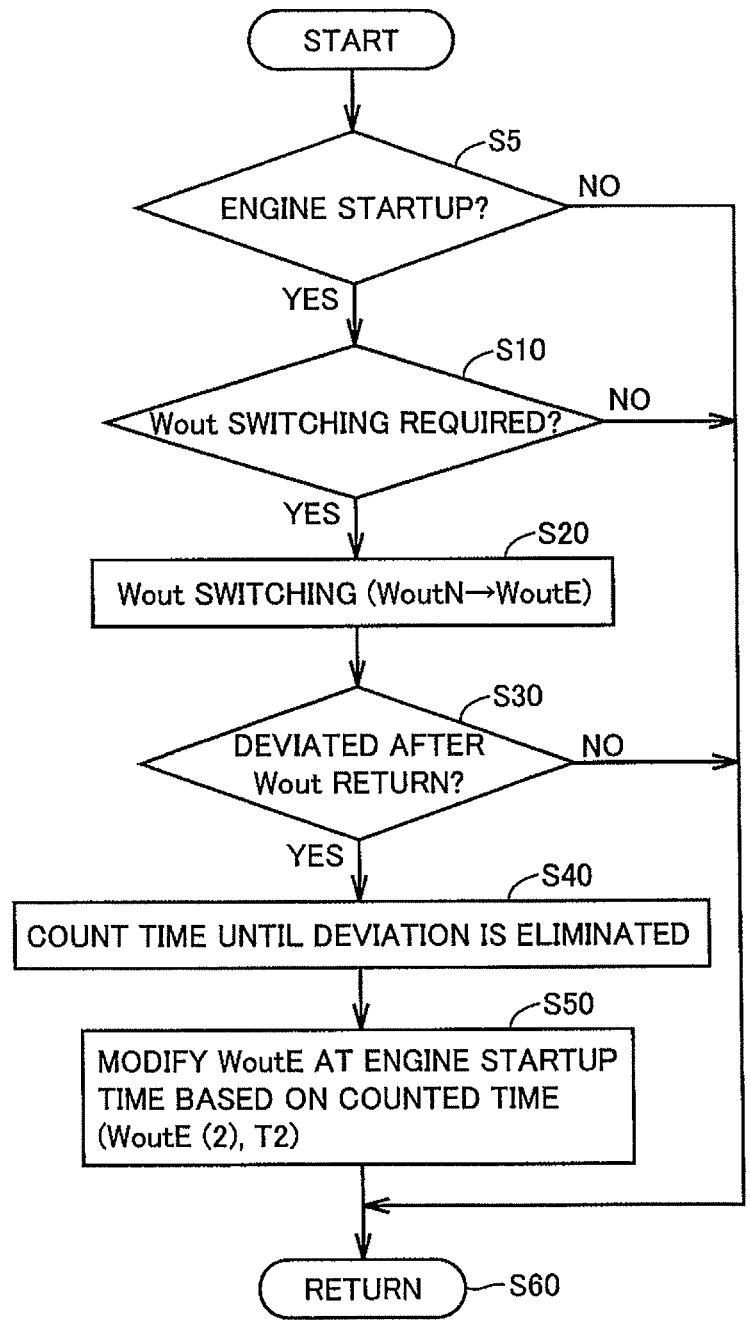
FIG. 8 is a flowchart to describe an operation of a Wout control unit of the ECU shown in FIG. 3.

FIG. 8 is a flowchart to describe the operation of Wout control unit 150 in ECU 15 shown in FIG. 3. Referring to FIG. 8, Wout control unit 150 determines whether startup of engine ENG is initiated or not based on the signal from running control unit 152 (step S5). When startup of engine ENG is not initiated (NO at step S5), Wout control unit 150 shifts the process to step S60 without executing the subsequent series of processing.

When a determination is made that startup of engine ENG is initiated at step S5 (YES at step S5), Wout control unit 150 determines whether switching of output allowable power Wout is required or not (step S10). Specifically, Wout control unit 150 determines that switching of output allowable power Wout is required when the required power for power storage device 10 corresponding to the running power plus the engine startup power exceeds output allowable power Wout (value WoutN (1)) at that stage.

When a determination is made that switching of output allowable power Wout is required at step S10 (YES at step S10), Wout control unit 150 switches output allowable power Wout from output allowable power WoutN (value WoutN (1)) to output allowable power WoutE (value WoutE (1)) (step S20).

Following the return of output allowable power Wout to output allowable power WoutN at the elapse of time T1, Wout control unit 150 determines whether the output power of power storage device 10 is deviated from output allowable power Wout or not (step S30). When not deviated (NO at step S30), Wout control unit 150 shifts the process to step S60.

When a determination is made that the output power of power storage device 10 is deviated from output allowable power Wout at step S30 (YES at step S30), Wout control unit 150 counts the period of time T2 (FIG. 4) until the deviation is eliminated (step S40). Time T2 may be calculated by counting deviated time $\Delta T$ (FIG. 4), and add deviated time $\Delta T$ to the former period of time T1. Based on counted time T2, Wout control unit 150 modifies the profile of output allowable power Wout at the startup time of engine ENG. Specifically, Wout control unit 150 modifies output allowable power WoutE at the engine startup time from value WoutE (1) to value WoutE (2) (<WoutE (1)), and sets the time during which output allowable power Wout is switched to output allowable power WoutE at the engine startup time as time T2.

Thus, in the first embodiment, in the case where electric power exceeding output allowable power Wout is output from power storage device 10 at the startup time of engine ENG, deviated from the period of time T1 during which output allowable power Wout of power storage device 10 is switched to output allowable power WoutE, the profile of output allowable power Wout for the next startup time of engine ENG is modified based on deviated time $\Delta T$ (period of time T2). Specifically, output allowable power WoutE at the engine startup time is modified from value WoutE (1) to value WoutE (2) (<WoutE (1)), and the period of time switched to output allowable power WoutE is modified from time T1 to time T2. Accordingly, the capability of power storage device 10 can be exhibited sufficiently while suppressing excessive output of power storage device 10 at the startup time of engine ENG. As a result, the design margin of the power storage device can be determined adequately, contributing to reducing the weight, size, cost and the like of the vehicle.

Second Embodiment

In contrast to the first embodiment in which output allowable power WoutE is modified from value WoutE (1) to value WoutE (2) (<WoutE (1)) for the next startup time of engine ENG when the output power of power storage device 10 deviates from output allowable power Wout at the startup time of engine. ENG, the second embodiment is directed to shortening the switched time of output allowable power Wout for the next startup time of engine ENG.

Figure 9:
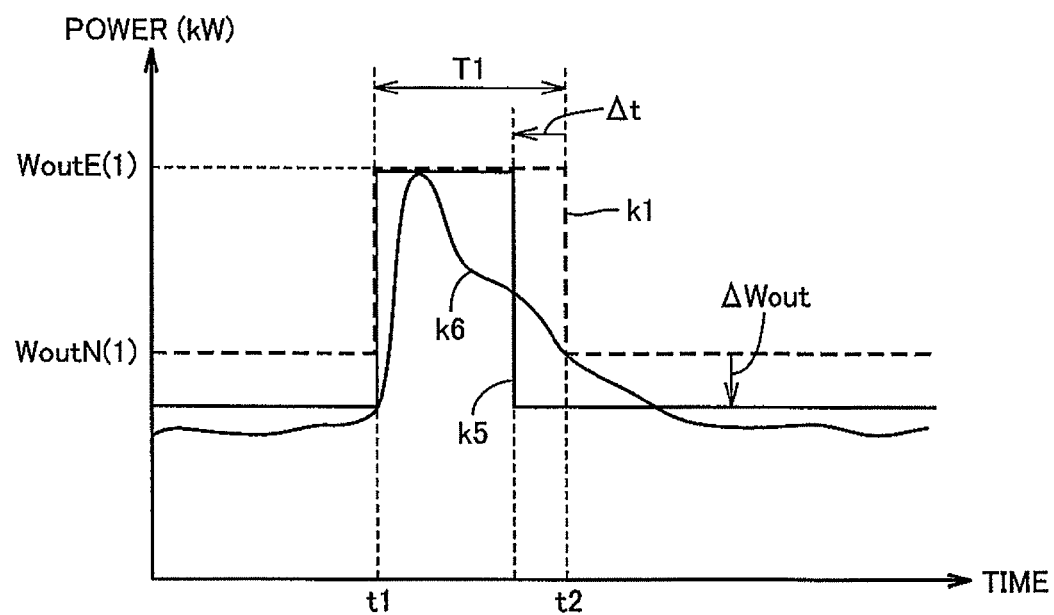
FIG. 9 represents the output allowable power and the output power from the power storage device for the next startup time of the engine according to a second embodiment.

FIG. 9 represents output allowable power Wout and the output power of power storage device 10 for the next startup time of engine ENG according to the second embodiment. Referring to FIG. 9 together with FIG. 4 corresponding to the case where the output power of power storage device 10 deviates from output allowable power Wout at the startup time of engine ENG, line k5 represents output allowable power Wout, and line k6 represents the output power of power storage device 10. Line k1, value WoutE (1), WoutN (1), and period of time T1 are as disclosed in FIG. 4.

In the event of output power of power storage device 10 (line k2) deviating from output allowable power Wout, as shown in FIG. 4, in association with the return of output allowable power Wout (time t2-t3 in FIG. 4) in the second embodiment, the switched time of output allowable power Wout for the next startup time of engine ENG is shortened by just $\Delta t$, as shown in FIG. 9, based on deviated time $\Delta T$ (=T2−T1). Moreover, output allowable power WoutN in a normal mode (non-startup time of engine) is set lower by just $\Delta$Wout based on deviated time $\Delta T$. Thus, deviation of the output power of power storage device 10 (line k6) from the essential output allowable power Wout indicated by line k1 can be avoided.

Figure 10:
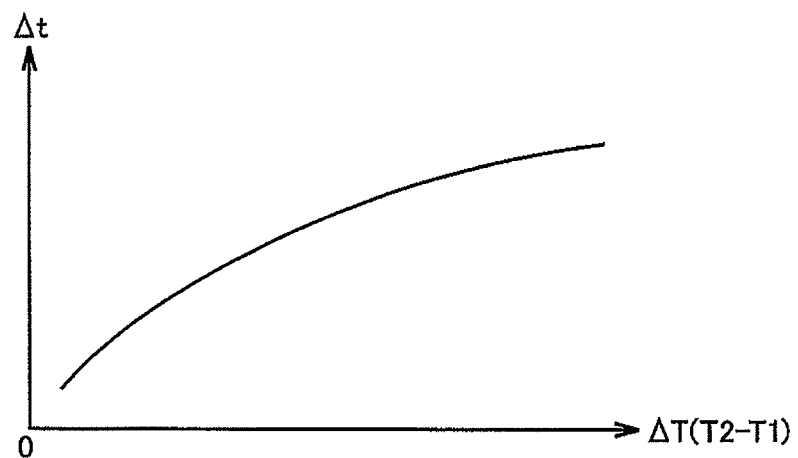
FIG. 10 represents the relationship between the deviated time of the output power of the power storage device at a startup time of the engine and the shortened time shown in FIG. 9.

FIG. 10 represents the relationship between the deviated time of the output power of power storage device 10 at the engine startup time and shortened time $\Delta t$ shown in FIG. 9. Referring to FIG. 10, shortened time $\Delta t$ is set to a larger value as the deviated time $\Delta T$ (FIG. 4) becomes longer.

Figure 11:
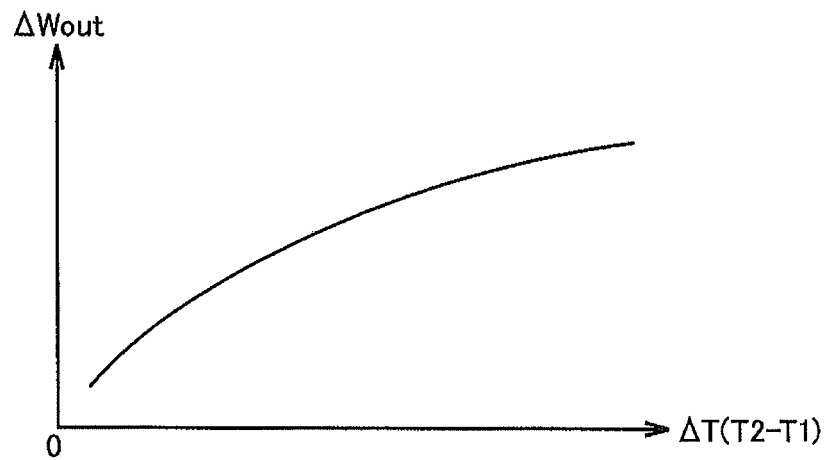
FIG. 11 represents the relationship between the deviated time of the output power of the power storage device at a startup time of the engine and the amount of reduction of the output allowable power shown in FIG. 9.

FIG. 11 represents the relationship between the deviated time of the output power of power storage device 10 at a startup time of the engine and the amount of reduction $\Delta$Wout of the output allowable power shown in FIG. 9. Referring to FIG. 11, reduction $\Delta$Wout of output allowable power Wout is set to a larger value as the deviated time $\Delta T$ (FIG. 4) becomes longer.

The entire configuration of the hybrid vehicle according to the second embodiment is identical to that of hybrid vehicle 100 of the first embodiment.

Figure 12:
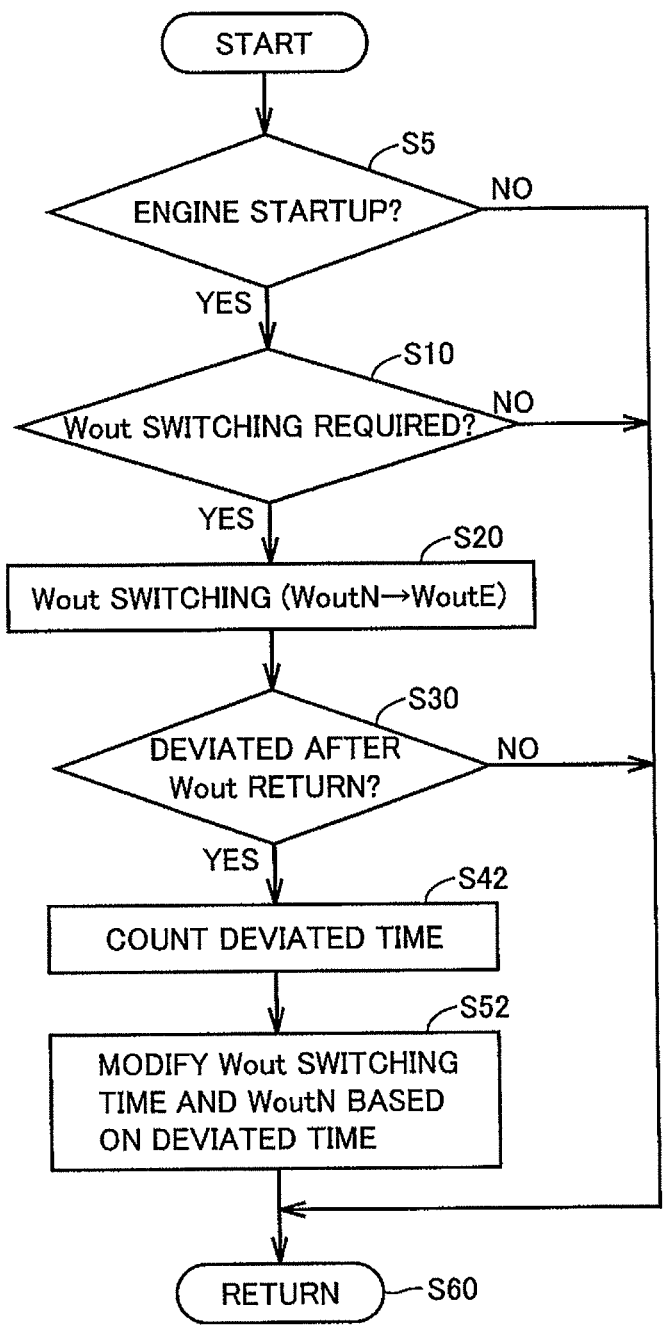
FIG. 12 is a flowchart to describe an operation of the Wout control unit of the ECU according to the second embodiment.

FIG. 12 is a flowchart to describe the operation of Wout control unit 150 in ECU 15 according to the second embodiment. Referring to FIG. 12, this flowchart corresponds to the flowchart of FIG. 8, including steps S42 and S52 instead of steps S40 and S50, respectively.

When a determination is made that the output power of power storage device 10 is deviated from output allowable power Wout at step S30 (YES at step S30), Wout control unit 150 counts the deviated time $\Delta T$ (FIG. 4) (step S42). Then, Wout control unit 150 shortens the switched time of output allowable power Wout for the next startup time of engine ENG by calculating shortened time $\Delta t$ based on the counted deviated time $\Delta T$ using the relationship shown in FIG. 10. Moreover, Wout control unit 150 uses the relationship shown in FIG. 11 to calculate reduction $\Delta$Wout of output allowable power Wout, based on the counted deviated time $\Delta T$, to modify output allowable power WoutN in a normal mode (non-startup time of engine ENG) (step S52).

Thus, in the case where electric power exceeding output allowable power Wout is output from power storage device 10 at the startup time of engine ENG, deviated from the period of time T1 during which output allowable power Wout of power storage device 10 is switched to output allowable power WoutE in the second embodiment, the switched period of time of output allowable power Wout for the next startup time of engine ENG is shortened based on deviated time $\Delta T$. Therefore, according to the second embodiment, the capability of power storage device 10 can be exhibited sufficiently while suppressing excessive output of power storage device 10 at the startup time of engine ENG. As a result, the design margin of the power storage device can be determined adequately, contributing to reducing the weight, size, cost and the like of the vehicle Third Embodiment Since the viscosity of the engine oil is increased when the temperature of engine ENG is low, the engine friction will be increased, so that engine ENG is not readily cranked up. In other words, when the temperature of engine ENG is low, the possibility of the output power of power storage device 10 deviating from output allowable power Wout at the startup time of engine ENG becomes higher. In the third embodiment, output allowable power WoutE at the engine startup time is corrected depending on the temperature of the coolant of engine ENG.

Figure 13:
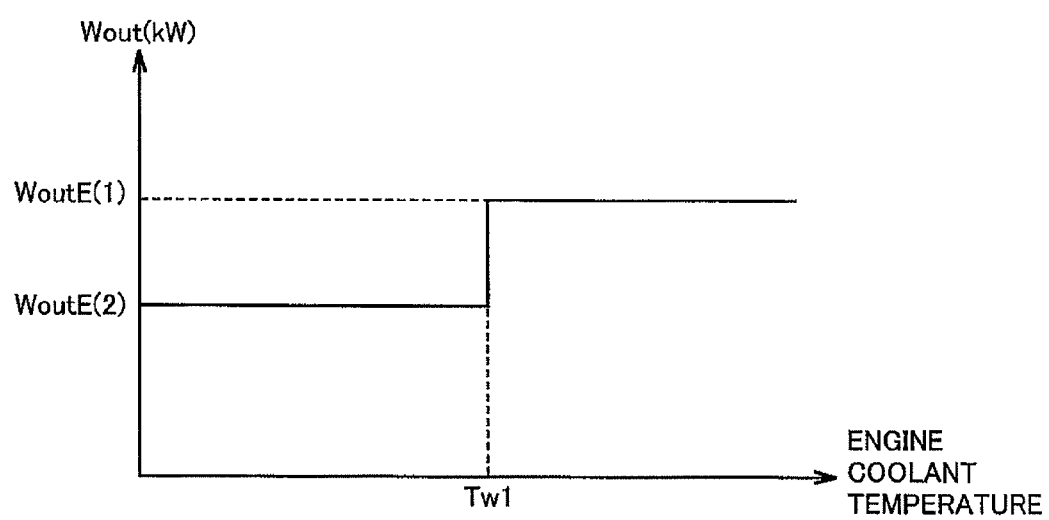
FIG. 13 represents the relationship between the temperature of the engine coolant and the output allowable power at a startup time of the engine according to a third embodiment.

FIG. 13 represents the relationship between the coolant temperature of engine ENG and output allowable power WoutE at the engine startup time according to the third embodiment. Referring to FIG. 13, when the output power of power storage device 10 is deviated from output allowable power Wout at the startup time of engine ENG in the third embodiment, the current temperature Tw1 of the engine coolant is obtained. Then, the temperature of the engine coolant is detected at the next startup time of engine ENG. If the detected temperature is lower than temperature Tw1, output allowable power WoutE is modified to WoutE (2) (<WoutE (1)). If the detected temperature is greater than or equal to temperature Tw1, output allowable power WoutE is set at WoutE (1) without modification.

The entire configuration of the hybrid vehicle according to the third embodiment is identical to that of hybrid vehicle 100 of the first embodiment.

Figure 14:
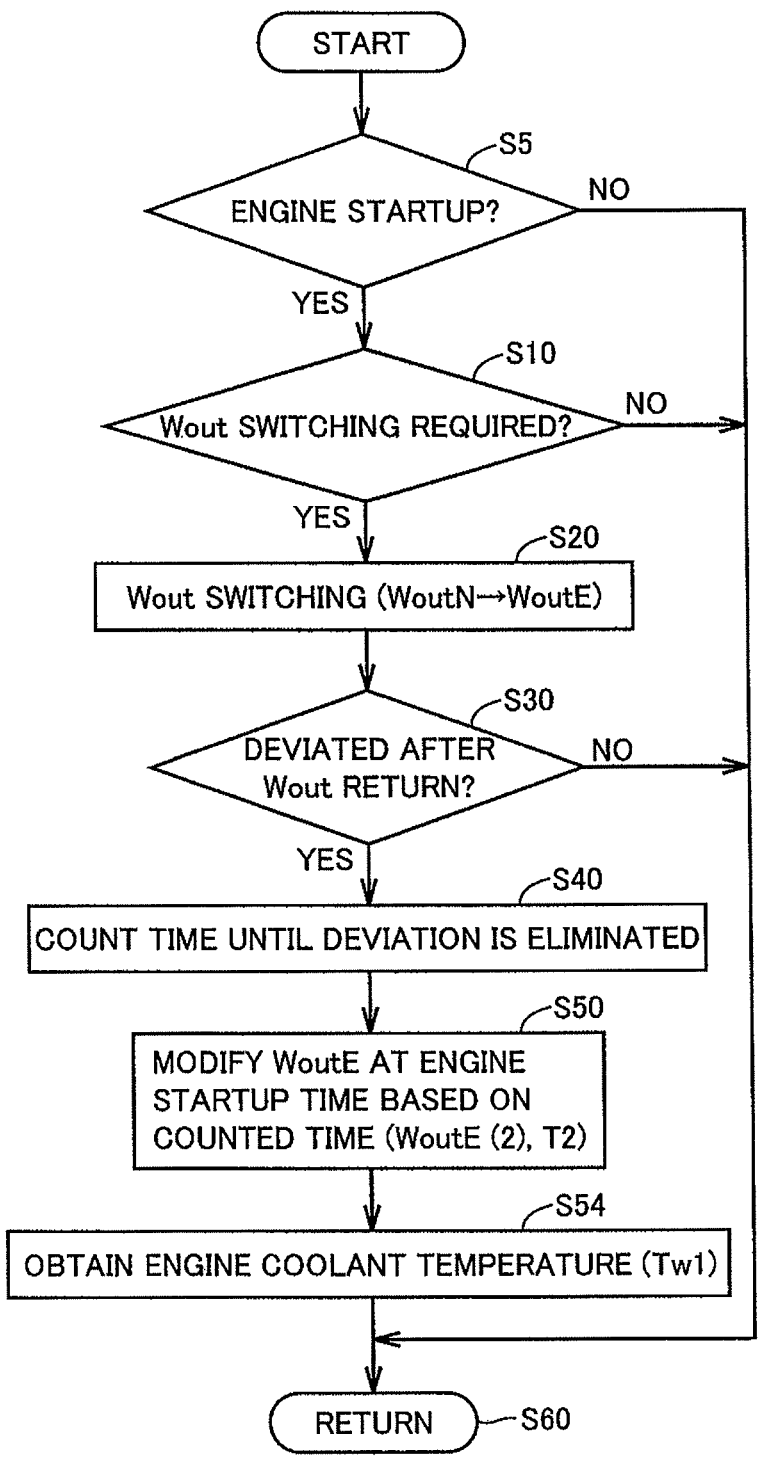
FIG. 14 is a flowchart to describe an operation of the Wout control unit of the ECU according to the third embodiment.

FIG. 14 is a flowchart to describe the operation of Wout control unit 150 in ECU 15 according to the third embodiment. Referring to FIG. 14, the flowchart corresponds to the flowchart of FIG. 8, further including step S54. Specifically, when the profile of output allowable power Wout for the startup time of engine ENG is modified at step S50, Wout control unit 150 obtains the temperature (Tw1) of the coolant of engine ENG (step S54). The coolant temperature of engine ENG is detected by a temperature sensor (not shown).

Figure 15:
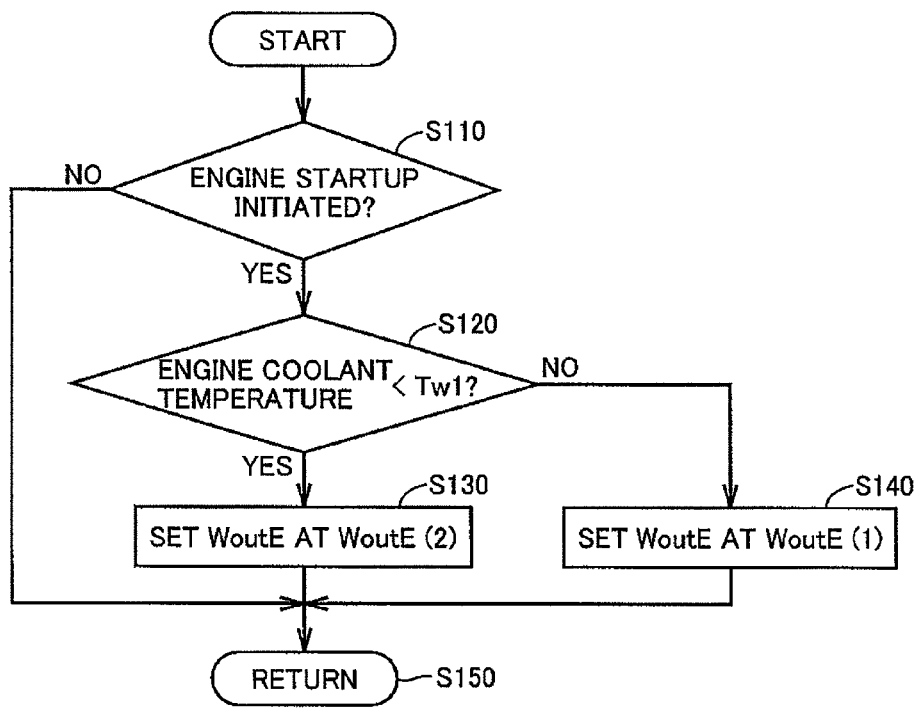
FIG. 15 is a flowchart to describe an operation of the Wout control unit for the next startup time of the engine.

FIG. 15 is a flowchart to describe the operation of Wout control unit 150 at the next startup time of engine ENG. Referring to FIG. 15, Wout control unit 150 determines whether startup of engine ENG is initiated or not (step S110). When startup of engine ENG is not initiated (NO at step S110), Wout control unit 150 shifts the process to step S150 without executing the subsequent series of processing.

When a determination is made that startup of engine ENG is initiated at step S110 (YES at step S110), Wout control unit 150 detects the current coolant temperature of engine ENG, and determines whether the detected temperature is lower than temperature Tw1 obtained at step S54 in FIG. 14 (step S120).

When a determination is made that the detected temperature is lower than temperature Tw1 (YES at step S120), Wout control unit 150 sets output allowable power WoutE at value WoutE (2) (<WoutE (1)) (step S130). When a determination is made that the detected temperature is greater than or equal to temperature Tw1 at step S120 (NO at step S120), Wout control unit 150 sets output allowable power WoutE at value WoutE (1) (step S140).

Figure 16:
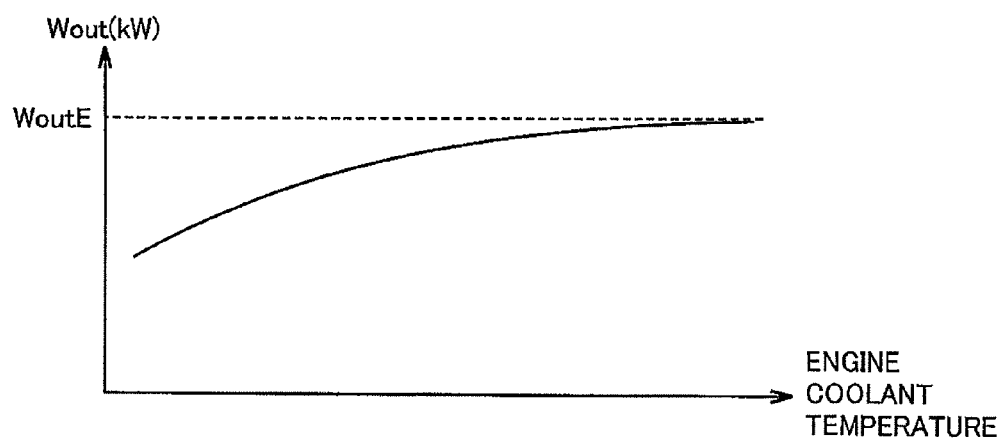
FIG. 16 is a diagram representing the relationship between the temperature of the engine coolant and the output allowable power at a startup time of the engine.

As shown in FIG. 16, the relationship between the coolant temperature of engine ENG and output allowable power WoutE may be determined in advance such that output allowable power WoutE at the engine startup time is reduced as the coolant temperature of engine ENG becomes lower, and determine output allowable power WoutE based on the coolant temperature of engine ENG detected at the startup time of engine ENG.

Since output allowable power WoutE for the next startup time of engine ENG is corrected based on the coolant temperature of engine ENG according to the third embodiment, variation in the output of power storage device 10 at the startup time of engine ENG can be further suppressed. As a result, the design margin of power storage device 10 can be determined more adequately, contributing to reducing the weight, size, cost and the like of the vehicle.

Fourth Embodiment

In comparison to the usage of the coolant temperature of engine ENG in the third embodiment, the fourth embodiment has an oil temperature sensor for detecting the temperature of the engine oil provided, and uses the temperature of the engine oil instead of the temperature of the coolant of engine ENG. In the fourth embodiment, output allowable power WoutE at the engine startup time is corrected depending on the temperature of the engine oil.

Figure 17:
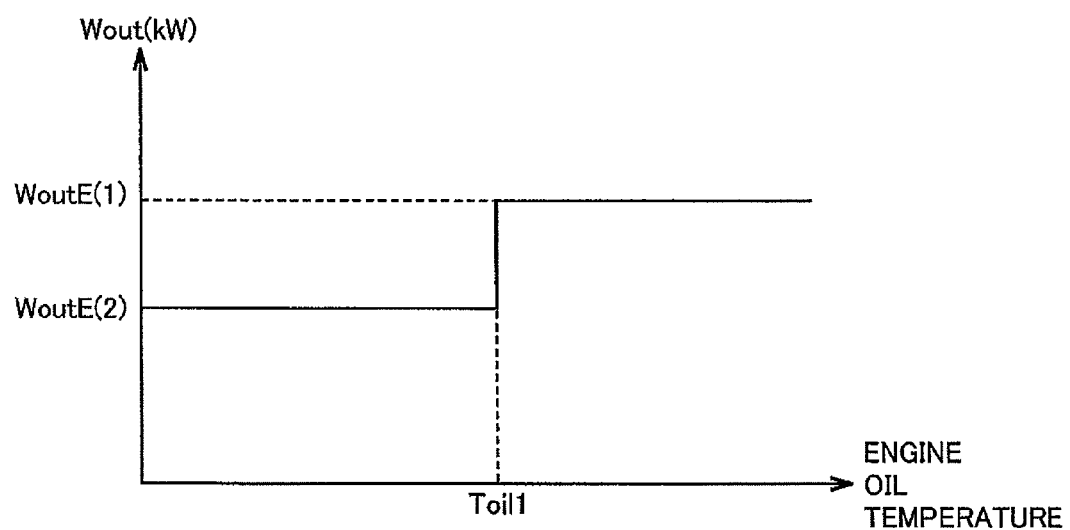
FIG. 17 represents the relationship between the temperature of engine oil and the output allowable power at a startup time of the engine according to a fourth embodiment.

FIG. 17 represents the relationship between the temperature of engine oil and output allowable power WoutE at the engine startup time according to the fourth embodiment. Referring to FIG. 17, when the output power of power storage device 10 is deviated from output allowable power Wout at the startup time of engine ENG in the fourth embodiment, the current temperature Toil1 of the engine oil is obtained. Then, the temperature of the engine oil is detected at the next startup time of engine ENG. If the detected temperature is lower than temperature Toil1, output allowable power WoutE is modified to WoutE (2) (<WoutE (1)). If the detected temperature is greater than or equal to temperature Toil1, output allowable power WoutE is set at WoutE (1) without modification.

The entire configuration of the hybrid vehicle according to the fourth embodiment is identical to that of hybrid vehicle 100 of the first embodiment.

Figure 18:
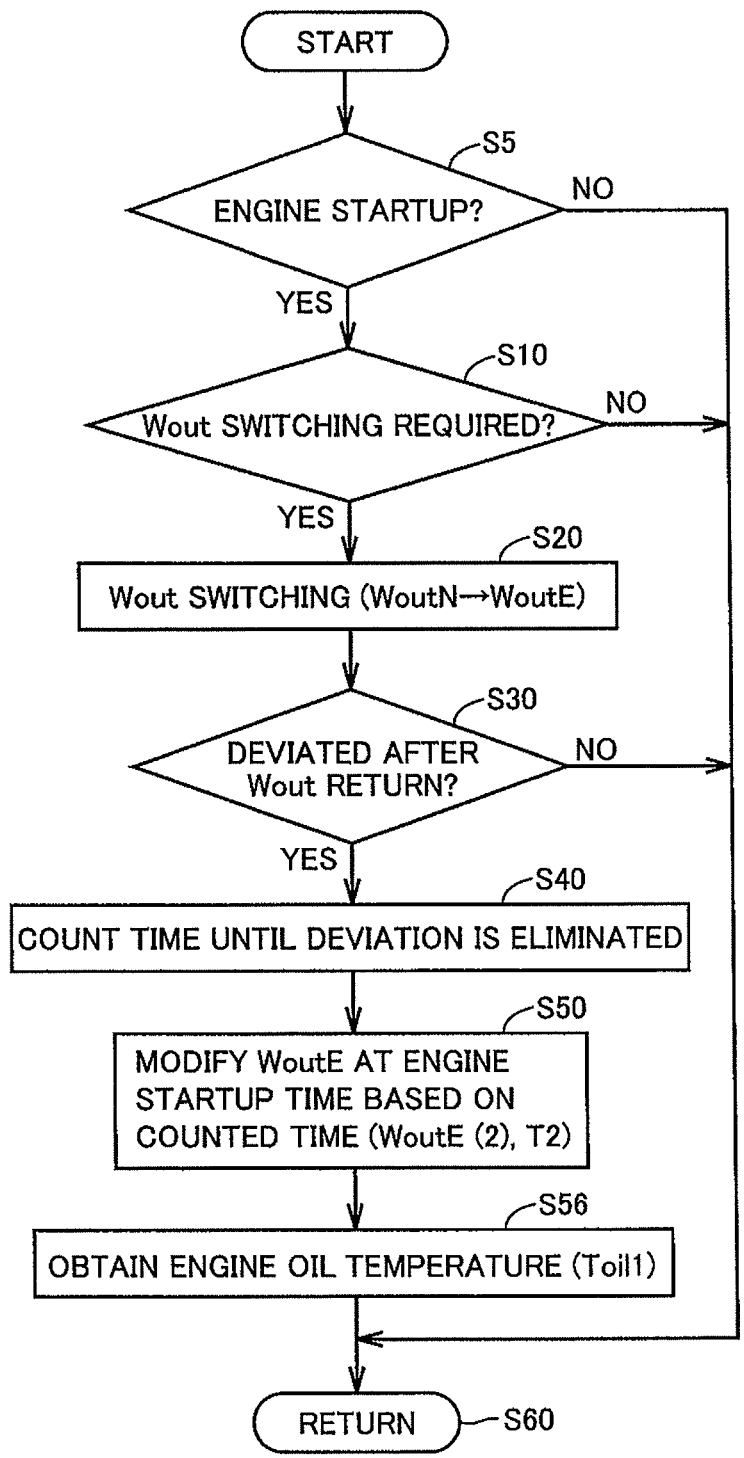
FIG. 18 is a flowchart to describe an operation of the Wout control unit of the ECU according to the fourth embodiment.

FIG. 18 is a flowchart to describe the operation of Wout control unit 150 in ECU 15 according to the fourth embodiment. Referring to FIG. 18, the flowchart corresponds to the flowchart of FIG. 14, including step S56 instead of S54. Specifically, after the profile of output allowable power Wout for the startup time of engine ENG is modified at step S50, Wout control unit 150 obtains the temperature (Toil1) of the engine oil (step S56). The temperature of engine oil is detected by an oil temperature sensor (not shown), For the oil temperature sensor, various well-known oil temperature sensors may be employed.

Figure 19:
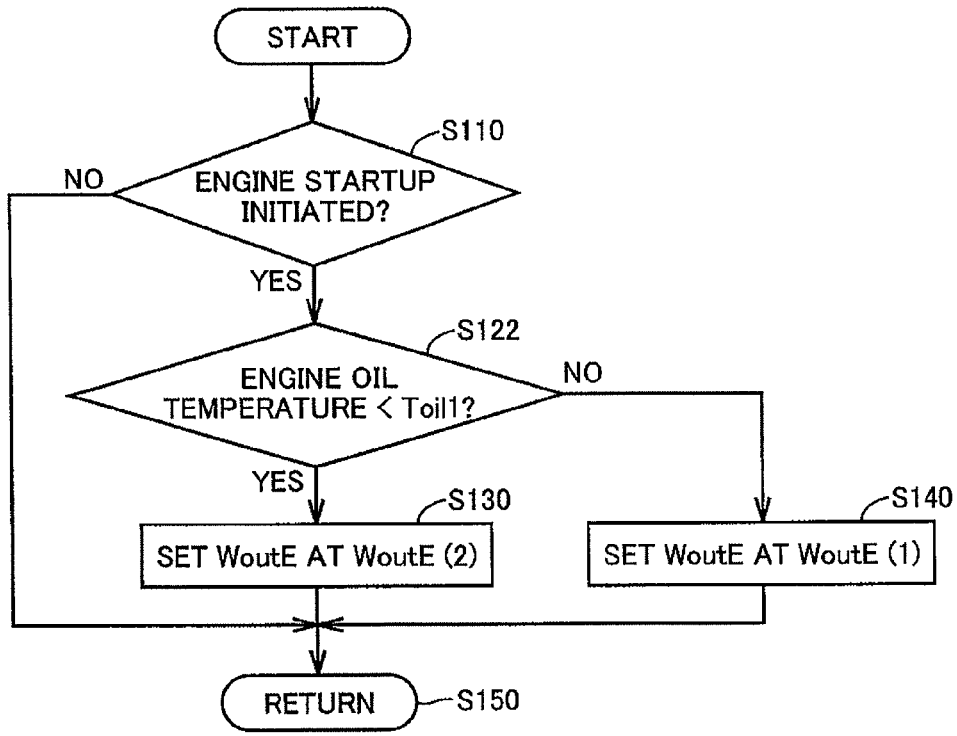
FIG. 19 is a flowchart to describe an operation of the Wout control unit for the next startup time of the engine.

FIG. 19 is a flowchart to describe the operation of Wout control unit 150 for the next startup time of engine ENG. Referring to FIG. 19, this flowchart corresponds to the flowchart of FIG. 15, including step S122 instead of step S120, Specifically, when a determination is made that startup of engine ENG is initiated at step S110, Wout control unit 150 detects the current temperature of the engine oil, and determines whether the detected temperature is lower than temperature Toil1 obtained at step S56 in FIG. 18 (step S122).

When a determination is made that the detected temperature is lower than temperature Toil1 at step S122 (YES at step S122), control proceeds to step S130 where output allowable power WoutE is set at WoutE (2) (<WoutE (1)), When a determination is made that the detected temperature is greater than or equal to temperature Toil1 at step S122 (NO at step S122), control proceeds to step S140 where output allowable power WoutE is set at value WoutE (1).

Figure 20:
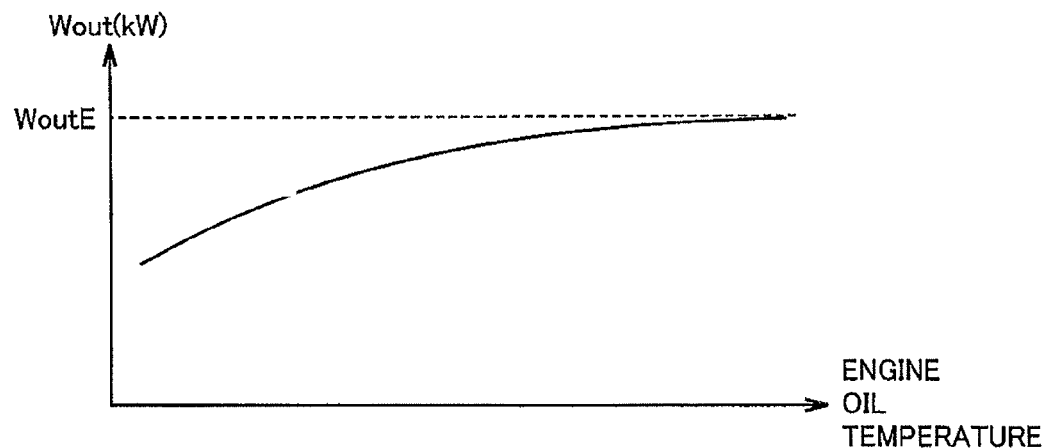
FIG. 20 represents the relationship between the temperature of engine oil and the output allowable power at a startup time of the engine.

As shown in FIG. 20, the relationship between the engine oil temperature and output allowable power WoutE may be determined in advance such that the output allowable power WoutE at the engine startup time is reduced as the engine oil temperature becomes lower, and determine output allowable power WoutE according to the engine oil temperature detected at the startup time of engine ENG.

Thus, advantages similar to those of the third embodiment can be achieved in the fourth embodiment.

Fifth Embodiment

Since the motor efficiency is degraded when the temperature of motor generator MG1 used in the startup of engine ENG rises, the torque for starting engine ENG is reduced. Therefore, there is a higher possibility of the output power of power storage device 10 being deviated from output allowable power Wout at the startup time of engine ENG in the case where the temperature of motor generator MG1 is high. In the fifth embodiment, output allowable power WoutE at the engine startup time is corrected depending on the temperature of motor generator MG1.

Figure 21:
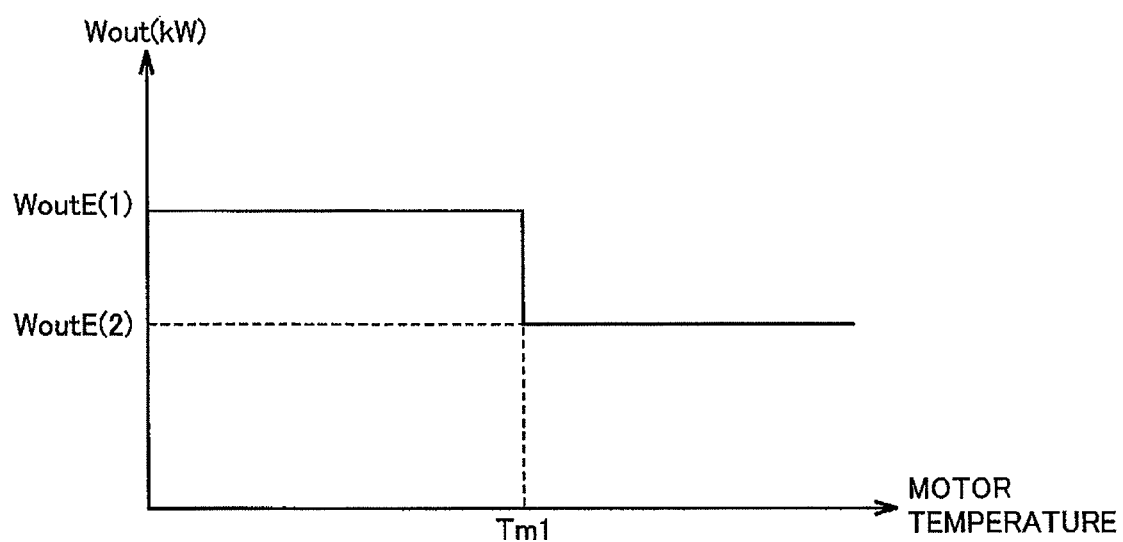
FIG. 21 represents the relationship between the temperature of the motor generator and the output allowable power at a startup time of the engine according to a fifth embodiment.

FIG. 21 represents the relationship between the temperature of motor generator MG1 and output allowable power WoutE at the engine startup time according to the fifth embodiment. Referring to FIG. 21, when the output power of power storage device 10 is deviated from output allowable power Wout at the startup time of engine ENG in the fifth embodiment, the current temperature Tm1 of motor generator MG1 is obtained. Then, the temperature of motor generator MG1 is detected at the next startup time of engine ENG. If the detected temperature is higher than temperature Tm1, output allowable power WoutE is modified to WoutE (2) (<WoutE (1)). If the detected temperature is lower than or equal to temperature Tm1, output allowable power WoutE is set at WoutE (1) without modification.

The entire configuration of the hybrid vehicle according to the fifth embodiment is identical to that of hybrid vehicle 100 of the first embodiment.

Figure 22:
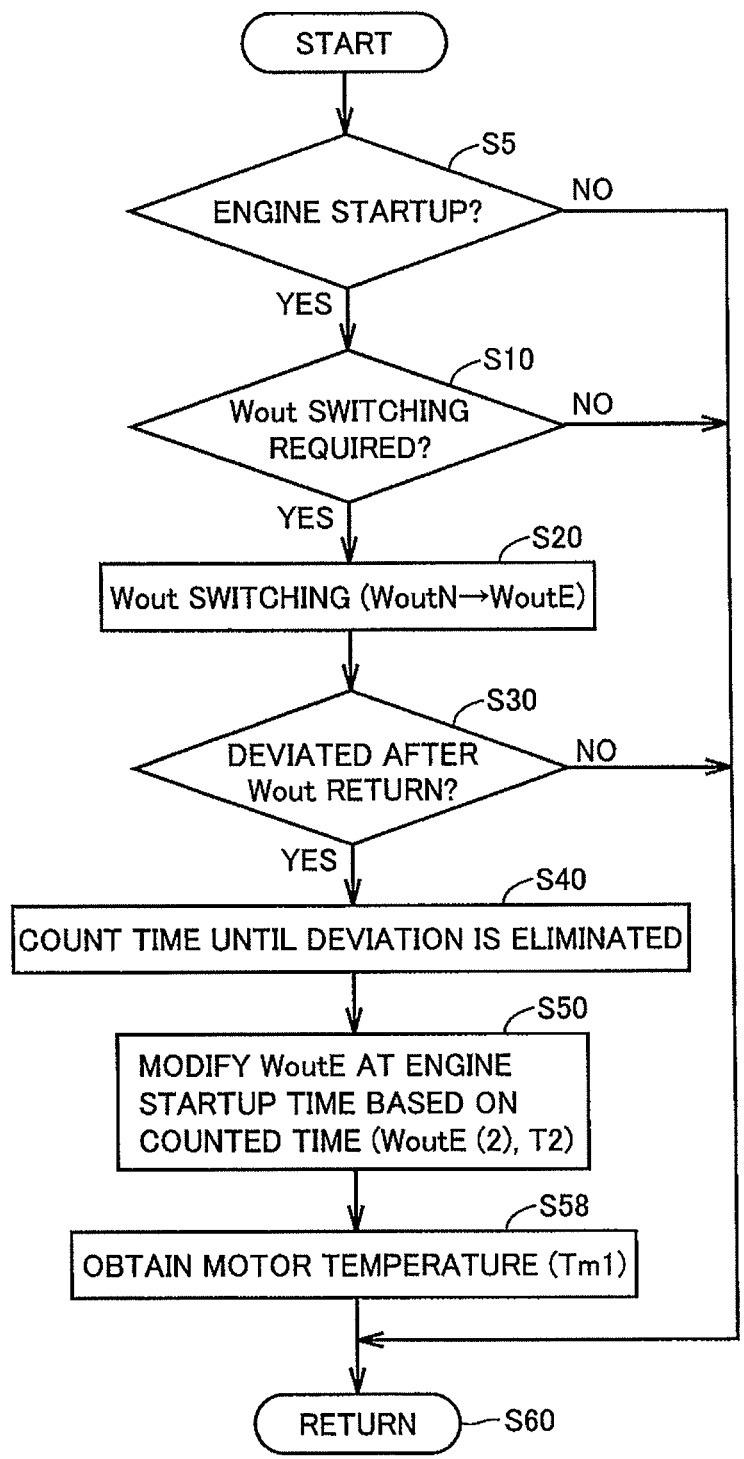
FIG. 22 is a flowchart to describe an operation of a Wout control unit of the ECU according to the fifth embodiment.

FIG. 22 is a flowchart to describe the operation of Wout control unit 150 in ECU 15 according to the fifth embodiment. Referring to FIG. 22, the flowchart corresponds to the flowchart of FIG. 14, including step S58 instead of S54. Specifically, after the profile of output allowable power Wout for the startup time of engine ENG is modified at step S50, Wout control unit 150 obtains the temperature (Tm1) of the motor generator MG1 (step S58). The temperature of motor generator MG1 is detected by a temperature sensor (not shown).

Figure 23:
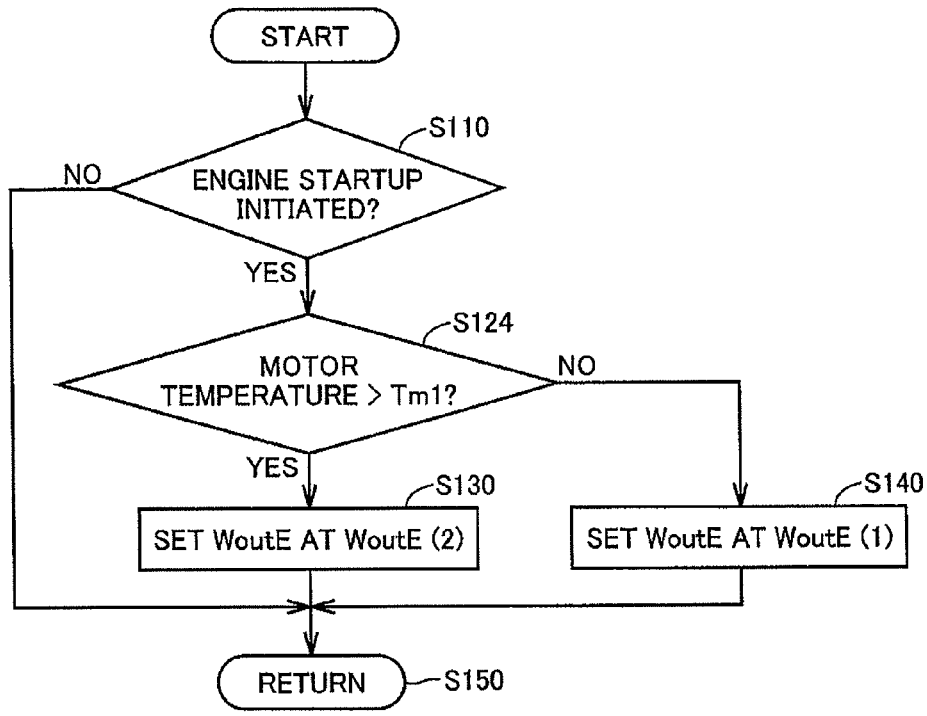
FIG. 23 is a flowchart to describe an operation of the Wout control unit for the next startup time of the engine.

FIG. 23 is a flowchart to describe the operation of Wout control unit 150 for the next startup time of engine ENG. Referring to FIG. 23, this flowchart corresponds to the flowchart of FIG. 15, including step S124 instead of step S120. Specifically, when a determination is made that startup of engine ENG is initiated at step S110, Wout control unit 150 detects the current temperature of motor generator MG1, and determines whether the detected temperature is higher than temperature Tm1 obtained at step S58 in FIG. 22 (step S124).

When a determination is made that the detected temperature is higher than temperature Tm1 at step S124 (YES at step S124), control proceeds to step S130 where output allowable power WoutE is set at WoutE (2) (<WoutE (1)). When a determination is made that the detected temperature is lower than or equal to temperature Tm1 at step S124 (NO at step S124), control proceeds to step S140 where output allowable power WoutE is set at value WoutE (1).

Figure 24:
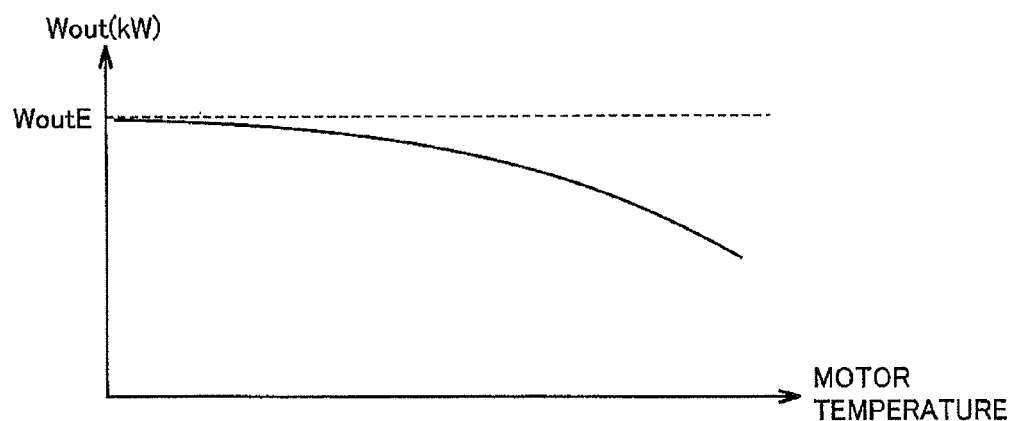
FIG. 24 represents the relationship between the temperature of the motor generator and the output allowable power at a startup time of the engine.

As shown in FIG. 24, the relationship between the temperature of motor generator MG1 and output allowable power WoutE may be determined in advance such that the output allowable power WoutE at the engine startup time is reduced as the temperature of motor generator MG1 becomes higher, and determine output allowable power WoutE according to the temperature of motor generator MG1 detected at the startup time of engine ENG.

Thus, advantages similar to those of the third embodiment can be achieved in the fifth embodiment.

Although not particularly illustrated, output allowable power WoutE may be corrected using the ambient environmental temperature, the oil temperature of the transmission, or the like, besides the coolant temperature of engine ENG, the engine oil temperature, and the temperature of motor generator MG1.

The present invention is also applicable to the so-called plug in hybrid vehicle that can have power storage device 10 charged from a power supply external to the vehicle (for example, grid power supply).

In the above description, engine ENG corresponds to an example of "internal combustion engine", and motor generator MG1 corresponds to an example of "rotating electric machine" in the present invention. ECU 15 corresponds to an example of "control device" in the present invention.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

REFERENCE SIGNS LIST 10 power storage device; 15 ECU; 20 PCU; 30 power output device; 40 transmission gear; 50L, 50R front wheel; 60L, 60R rear wheel; 100 hybrid vehicle; 105 SMR; 110 converter; 131, 132 inverter; 134 power split device; 140 converter/inverter control unit; 150 Wout control unit; 152 running control unit; 154 command generation unit; MG1, MG2 motor generator; ENG engine.

The invention claimed is:

1. A hybrid vehicle comprising:
a power storage device storing electric power for traction,
an internal combustion engine,
a rotating electric machine receiving supply of electric power from said power storage device, and generating torque required to start said internal combustion engine, and
a control device temporarily switching output allowable power indicating a value of output power allowed from said power storage device at a startup requested time of said internal combustion engine from first allowable power for said startup requested time to second allowable power greater than said first allowable power, when electric power required for said power storage device at a startup time of said internal combustion engine exceeds the output allowable power,
said control device suppressing increase of said output allowable power for a next startup time of said internal combustion engine, when electric power exceeding said output allowable power is output from said power storage device at a startup time of said internal combustion engine, deviated from a period of time during which said output allowable power is switched to said second allowable power.

2. The hybrid vehicle according to claim 1, wherein said control device modifies said second allowable power for the next startup time of said internal combustion engine from a first value to a second value lower than said first value based on a time deviated from the period of time during which the output allowable power is switched to the second allowable power.

3. The hybrid vehicle according to claim 2, wherein said second value is determined based on said deviated time, using data prepared in advance, indicating a relationship between said output power and an allowable time during which output can be provided continuously from said power storage device.

4. The hybrid vehicle according to claim 1, wherein said control device shortens the period of time during which said output allowable power is switched to said second allowable power for the next startup time of said internal combustion engine based on a time deviated from the period of time during which said output allowable power is switched to said second allowable power.

5. The hybrid vehicle according to claim 4, wherein said control device shortens the period of time during which said output allowable power is switched to said second allowable power as said deviated time becomes longer.

6. The hybrid vehicle according to claim 1, wherein said control device corrects said second allowable power based on a temperature of said internal combustion engine.

7. The hybrid vehicle according to claim 6, wherein said control device corrects said second allowable power to become smaller as the temperature of said internal combustion engine becomes lower.

8. The hybrid vehicle according to claim 1, wherein said control device corrects said second allowable power based on a temperature of said rotating electric machine.

9. The hybrid vehicle according to claim 8, wherein said control device corrects said second allowable power to become smaller as the temperature of said rotating electric machine becomes higher.

10. An output control method of a power storage device mounted on a hybrid vehicle, said hybrid vehicle including
said power storage device storing electric power for traction,
an internal combustion engine, and
a rotating electric machine receiving supply of electric power from said power storage device, and generating torque required to start said internal combustion engine,
said output control method comprising the steps of:
when electric power required for said power storage device at a startup time of said internal combustion engine exceeds output allowable power indicating a value of output power allowed from said power storage device for a startup requested time of said internal combustion engine, temporarily switching said output allowable power from first allowable power at said startup requested time to second allowable power greater than said first allowable power, and
when electric power exceeding said output allowable power is output from said power storage device at a startup time of said internal combustion engine, deviated from a period of time during which said output allowable power is switched to said second allowable power, suppressing increase of the output allowable power for a next startup time of said internal combustion engine.

11. The output control method of a power storage device according to claim 10, wherein said step of suppressing increase of the output allowable power includes the step of modifying said second allowable power for the next startup time of said internal combustion engine from a first value to a second value lower than said first value, based on a time deviated from the period of time during which the output allowable power is switched to the second allowable power.

12. The output control method of a power storage device according to claim 10, wherein said step of suppressing increase of the output allowable power includes the step of shortening the period of time during which said output allowable power is switched to said second allowable power for the next startup time of said internal combustion engine, based on the time deviated from the period of time during which the output allowable power is switched to the second allowable power.

13. The output control method of a power storage device according to claim 10, further comprising the step of correcting said second allowable power based on a temperature of said internal combustion engine.

14. The output control method of a power storage device according to claim 10, further comprising the step of correcting said second allowable power based on a temperature of said rotating electric machine.

* * * * *